United States Patent [19]
No et al.

[11] Patent Number: 4,828,304
[45] Date of Patent: May 9, 1989

[54] VACUUM ADSORPTION HAND

[75] Inventors: Shinichiro No, Hoya; Minao Kimura, Tokorozawa, both of Japan

[73] Assignee: Kabushiki Kaisha Yakult Honsha, Tokyo, Japan

[21] Appl. No.: 92,973

[22] Filed: Sep. 4, 1987

[30] Foreign Application Priority Data

Sep. 9, 1986 [JP] Japan .............................. 61-137288[U]
Sep. 16, 1986 [JP] Japan .............................. 61-140590[U]

[51] Int. Cl.⁴ .......................... B25J 15/06; B25J 15/08
[52] U.S. Cl. ........................................ 294/2; 294/64.1; 294/106; 294/902; 901/36; 901/40
[58] Field of Search .................... 294/2, 64.1, 65, 67.3, 294/67.31, 86.4, 88, 106, 119.1, 902; 414/606, 627, 729, 731, 736, 739, 741, 744 B, 752, 753; 901/30, 31, 36, 40

[56] References Cited

U.S. PATENT DOCUMENTS

| | | | |
|---|---|---|---|
| 2,783,078 | 2/1957 | Billner .................................. | 294/2 X |
| 3,387,718 | 6/1968 | Roth et al. .......................... | 294/2 X |
| 3,651,957 | 3/1972 | Ball et al. ............................. | 294/2 X |
| 3,809,423 | 5/1974 | Gazuit .................................. | 294/88 |
| 4,355,936 | 10/1982 | Thomas et al. ..................... | 294/2 X |
| 4,627,785 | 12/1986 | Monforte . | |

FOREIGN PATENT DOCUMENTS

| | | |
|---|---|---|
| 2600290 | 7/1977 | Fed. Rep. of Germany . |
| 3312483 | 10/1984 | Fed. Rep. of Germany . |
| 2561564 | 9/1985 | France . |
| 220799 | 4/1985 | German Democratic Rep. . |
| 224801 | 7/1985 | German Democratic Rep. . |

*Primary Examiner*—Johnny D. Cherry
*Attorney, Agent, or Firm*—Beveridge, DeGrandi & Weilacher

[57] ABSTRACT

A vacuum adsorption hand and a composite hand mechanism attachable to the arm or the like of a material handling industrial robot are disclosed. The vacuum adsorption hand includes a sponge-like element on the outer surface of a perforated plate defining a vacuum chamber to prevent the ports or perforations in the plate from being obstructed by packaging film on an article to be handled. The composite hand mechanism of the present invention includes grasping mechanisms for grasping the sides of an article to be held in addition to an adsorbing mechanism. The grasping mechanisms have first members adapted for transverse movement to apply an adjustable transverse grasping force and second members which are vertically movable with respect to the first members. The grasping mechanisms ensure that the article will be held securely despite the effects of horizontally-oriented forces acting on the article held by the composite hand mechanism.

1 Claim, 7 Drawing Sheets

VACUUM ADSORPTION HAND

BACKGROUND OF THE INVENTION

The present invention relates to a vacuum adsorption hand for use with a material handling machine, for example, on the arm of a material-handling robot, to handle a material.

Further, the invention relates to a composite hand mechanism for an industrial robot, which hand mechanism includes means attachable to the wrist portion of the arm of the robot. Likewise, the hand is attachable to, for example, a manipulator, a crane, or other such apparatus for adsorbing and grasping a material.

Various types of apparatus such as robots, manipulators, fork lifts, trucks, cranes, and the like have served as material handling machines. Such apparatus are provided with means such as "hands" to hold or grasp a material or an article; the hands are connected to the apparatus. Generally, these hands are classified as fingerless types and types having fingers adapted to grasp a material. The fingered hands for example, pinch, sandwich, grasp, or likewise grip the material. Fingerless hands generally fall into two categories, those that hold a material by adsorption and those that receive material. Further, hands of the adsorbing type are classified as vacuum types or magnetic types.

Many of the hands having fingers use a system in which claws are inserted from the side portions of a material into the material to thereby sandwich the material. The material is then lifted and/or moved. This presents a problem in that when many articles are to be stacked adjacently, they cannot be stacked without a gap. In the case of conventional adsorption type fingerless hands, however, components such as arms or the like are not present on the sides of the hand. Therefore, many articles can be adjacently stacked.

Accordingly, adsorption type hands have been used for adjacently stacking materials or removing materials from stacks. Where the material was not adsorbable by magnetism, a vacuum type adsorption hand was used.

In general, a vacuum type adsorption hand is formed with a vacuum chamber in communication with a vacuum source. The upper surface of a material is adsorbed by the vacuum chamber. By moving the hand and an arm of an industrial robot together with the adsorbed material, the material can be loaded or unloaded, for example, or otherwise moved.

Once the material has been moved, the material can be released from the arm simply by introducing air into the vacuum chamber of the hand. According to the procedure, only the upper surface of a material is adsorbed. This presents advantages in that the loading work by the adsorption hand can be simplified. Also, the structure of the hand itself can be simple. Moreover, the adsorbing force is relatively large so that even fairly heavy materials can be safely moved.

A packaged material or article, wrapped in a plastic film or the like, presents special problems for conventional adsorption hands. Air suction ports are provided in the vacuum chamber to maintain the vacuum in the chamber. However, when a film or the like adheres over the air suction ports and closes the ports, the necessary vacuum condition for adsorption cannot be maintained. As a solution to this problem, a method has been considered in which the vacuum chamber is covered by a perforated metal or a wire net. However, in the case of the perforated metal, although direct obstruction of the air suction ports is prevented, the holes in the metal plate are closed by the plastic film or the like. On the other hand, the adsorbing force to adsorb a packaged material is determined by the total area of the holes formed in the perforated metal and the remaining surface, other than the holes, provides no adsorbing force and is dead space. Given such dead space, an adsorbing surface having a large area is needed to obtain a desired adsorbing force, whereby the size of the hand must be increased. This likewise is problematical.

Further, conventional adsorption hands are disadvantageous in that although their holding force by adsorption in the vertical direction is large, the holding force in the horizontal direction is small. Thus, when a force in the horizontal direction acts on the material held, the material may be separated from the adsorption pad of the hand since the adsorbing force in the horizontal direction is relatively weak. In addition, although the adsorbing force of the adsorption type hand is strong, in order to more safely perform the task of moving the material, a mechanical means which is certain to grasp the material is required.

SUMMARY OF THE INVENTION

The present invention addresses the problems characteristic of the foregoing conventional apparatus. It is an object of the invention to provide a vacuum adsorption hand having a large adsorbing force in a predetermined area which hand is capable of holding a material packaged by a film such as a plastic film.

Another object of the invention is to provide a composite hand mechanism which both adsorbs and grasps a material. According to a preferred embodiment, the present invention comprises a mechanism which is unaffected by forces in the horizontal direction against the adsorbed material. The position at which the hand adsorbs the material is not changed. The adsorbing force is assisted.

According to a vacuum adsorption hand of the present invention, a concave portion connectable with a vacuum sorce is formed in a frame to adsorb and hold a material to thereby couple the material with a handling machine. The vacuum chamber is formed in the underside of the frame by the concave portion which is covered with a porous plate having a plurality of holes therein. A sponge-like material having continuous air bubbles throughout is provided on the outer surface of the porous plate which faces the material to be handled.

According to the invention a composite hand mechanism for use with an industrial robot comprises an adsorbing mechanism located in the central portion of a frame which is adapted to be coupled with a wrist portion of the arm of the industrial robot. The adsorbing mechanism adsorbs the upper surface of a material to be handled by vacuum force. Grasping mechanisms, arranged on both sides of the adsorbing mechanism, also act to sandwich opposite side surfaces of the material. Each grasping mechanism includes a sandwiching frame pivotally attached to the frame of the hand by hinge pins. The spacing between the sandwiching frame and the material and the sandwiching force applied by the sandwiching frame are adjustable. The sandwiching plate is vertically movable relative to the sandwiching frame to grasp the material. By means of a rack and pinion mechanism for translating motion to the sandwiching plates, the plates are moved vertically by a distance which is twice that moved by a member of a drive source.

The vacuum adsorption hand of the invention, as generally described above, has its frame attached to the arm of the material handling machine, e.g., the arm of a robot. The permeable or porous sponge-like material contacts the surface of the material to be handled. A vacuum is provided in the vacuum chamber by a vacuum source. The material is adsorbed to the frame through the sponge material. In this manner material handling is performed. During material handling, performed as described above with the adsorption type hand according to the present invention, a number of materials can be stacked adjacently or removed from such stack.

According to the preferred vacuum adsorption hand of the invention, the perforated plate forms a part of the vacuum chamber. Since the sponge-like material is attached to the outer or material-facing surface of the plate, the holes in the plate are not obstructed by the wrapping or film of a packaged article when the article is adsorbed. Therefore, the effective adsorption area is equal to the entire surface of the concave portion, which corresponds to almost the entire surface of the vacuum chamber, to provide increased adsorbing force. Moreover, since the portion of the hand which contacts the material to be handled preferably consists of a sponge-like element, the article or material to be handled will not be damaged. In particular, where a plastic film packaged article is to be handled, handling can be carried out without damaging the film. Further, the sponge-like material acts as a filter., it can prevent dust from closing the air suction ports of the vacuum source or the vacuum chamber. Particularly, when the vacuum is provided by an ejector type vacuum pump, inflows of dust can cause the pump to fail if the orifice thereof becomes choked with dust. However, in the hand of the present invention, the filtering action of the sponge-like material prevents dust from choking the pump or orifice. Further, it has been observed that a small hole such as a pin hole in the film results in a weakened adsorbing force. Therefore, if a measurement means indicating a value of the absorbing force is added to the vacuum absorption hand of the present invention, it is possible to check whether there is any pin hole in the film.

According to the invention the composite hand mechanism for an industrial robot, arranged as described above, is envisioned as having its frame attached to a material-handling arm of the robot. A vacuum source is connected to the adsorbing mechanism. A power source or a hydraulic pressure source is connected to the drive source of the sandwiching frame and to the drive source of the rack and pinion mechanism for driving the sandwiching frame and the rack and pinion mechanism. The material handling hand is positioned over the material to be handled to adsorb the upper surface of the material. The sandwiching plate of the hand is extended to a predetermined length by the rack and pinion mechanism and the material is grasped, i.e., sandwiched from opposite sides. Once the material is so grasped, the arm is driven to move the material in accordance with any desired movement. After completion of the movement, air is introduced into the vacuum chamber to extinguish the adsorbing force. The sandwiching frame of the grasping mechanism is driven to separate the sandwiching plates from the material to release the material. In this manner, the material handling work for a single article is carried out. Handling for another article is executed in a similar manner.

According to the composite hand mechanism of the present invention, the material handling work for several types of articles or materials can be performed as explained above. Since grasping mechanisms are provided on opposite sides of the adsorbing mechanism to grasp opposite sides of the material during handling, even if a force in the horizontal direction acts on the material, the force is ineffective to move the material in the horizontal direction against the sandwiching plates of the grasping mechanisms. This prevents releasing and dropping the material whereby material handling is performed safely. Further, the grasping mechanism can continue to hold the material even if the adsorbing force produced by the vacuum is suddenly lost. Also, the grasping mechanisms act to mutually align the adsorbing mechanism and material held. In this way, the composite hand mechanism also adjusts the position of the material.

As described above, in the preferred composite hand mechanism of the present invention, since adsorption and grasping can be performed simultaneously, an article can be grasped by the grasping mechanisms to avoid dropping the article even though pin holes are present in its packaging film, which holes weaken the adsorbing force. Alternatively, where items are stacked with little space between the stacks, the grasping mechanisms cannot be used and instead, the material is first moved by the adsorbing mechanism to a position wherein the grasping mechanisms can be used and thereafter, the material can be sandwiched by the grasping mechanisms. Therefore, the materials can be handled properly irrespective of their initial positions.

In implementing the vacuum adsorption hand of the present invention, it is desirable to use a perforated metal as the porous plate. This is because a perforated metal is relatively strong but inexpensive. Alternatively, a metal net could be used as the porous plate. A plate having a plurality of slots formed therein also could be used. It is preferable to detachably or exchangeably attach the sponge-like element to the porous plate. Since the sponge-like element may be damaged, it is recommended to have several of the sponge-like elements and to exchange any damaged sponge-like element for a new one.

In implementing the composite hand mechanism of the invention for use with an industrial robot, it is desirable to drive the sandwiching frame and the pinion of the rack and pinion mechanism by means of a hydraulic cylinder. The adsorbing mechanism requires a vacuum source. When an ejector type vacuum pump is used, it is convenient to use a cylinder which is actuated by pneumatic pressure derived from the vacuum pump. Since materials packaged by plastic film are also to be handled by the hand of the present invention, it also is preferable to implement the adsorbing mechanism with a porous plate covering a vacuum chamber and a sponge-like element having continuous air bubbles throughout provided on the outer material-facing surface of the porous plate. This prevents the packaging material such as a plastic film or the like from closing the air suction holes of the plate.

BRIEF DESCRIPTION OF THE DRAWING

The foregoing and other objects and features of the present invention will become more apparent from the following detailed description and the appended claims when considered with reference to the accompanying drawings in which like parts bear like reference numerals. In the drawings:

DETAILED DESCRIPTION OF THE PREFERRED EMBODIMENTS

Figure 1:
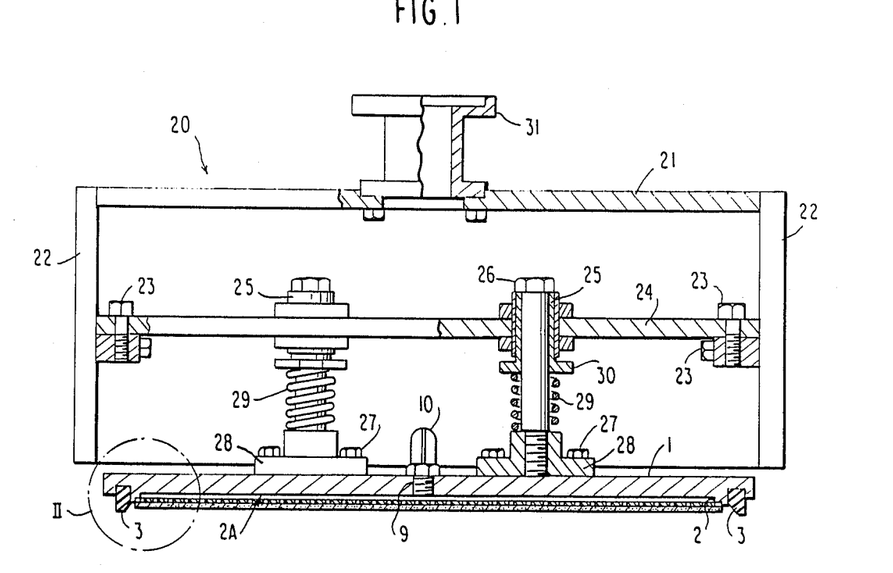
FIG. 1 is a side, cross-sectional view of a preferred embodiment of a vacuum adsorption hand according to the present invention.
Figure 2:
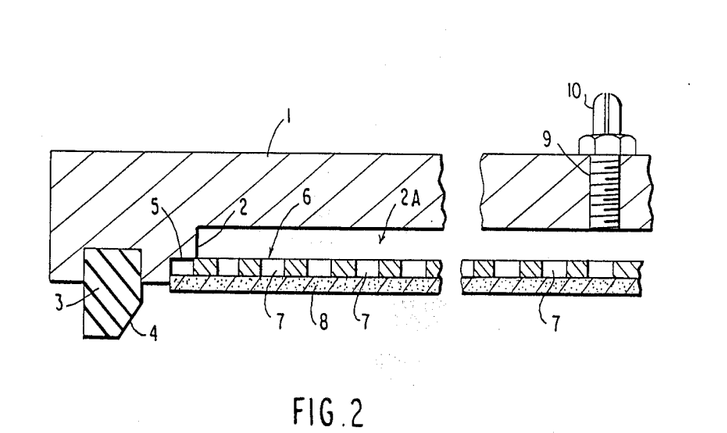
FIG. 2 is an enlarged cross-sectional view of the portion indicated by the circle II in FIG. 1.

A preferred embodiment of a vacuum adsorption hand according to the present invention is shown in FIGS. 1 and 2 to include a frame 1 supported by a supporting frame 20. The frame 1 is generally rectangular. A concave portion 2 is formed in the lower surface of the frame 1 which faces an article or material to be held. The concave portion 2 provides a part of a vacuum chamber generally identified by reference character 2A. An adsorption pad 3 is embedded in the peripheral edge portion of the concave portion 2. A tapered edge 4 is formed on the inside of the adsorption pad 3 to improve the hermetical properties of the seal with the surface of the article which comes into contact with the pad and also to facilitate alignment of the frame 1 with the article.

An enlarged mouth section 5 is formed in the peripheral edge portion of the concave portion 2. A perforated or porous plate 6 is secured in the mouth section 5. The vacuum chamber 2A is provided by the concave portion 2 and porous plate 6. The plate 6 is made porous by a plurality of openings identified by reference numeral 7. In the preferred embodiment of FIGS. 1 and 2, a perforated metal plate is used as the porous plate 6. A sponge-like element 8 is secured to the outer or material-handling handling surface (the lower surface in FIG. 2) of the porous plate 6. Preferably, the sponge-like element 8 is secured to the outer peripheral edge of the plate 6 by means such as a double coated adhesive tape or the like. It will be appreciated that the sponge-like element 8 can be detachably secured to the porous plate 6 by other means as well. A threaded hole 9 is provided in the central portion of the frame 1. A connector 10 is received within the hole 9. The connector 10 is adapted for coupling with a vacuum source (not shown).

The frame 1 is arranged to depend from a material handling machine (not shown), for example, an arm of a robot. The supporting frame 20 for coupling the adsorption hand of the present invention with the arm (not shown) comprises a first horizontal frame 21 disposed in a first horizontal plane, side plates 22 for supporting the side edges of the horizontal frame 21 and a second horizontal frame 24 disposed in a second horizontal plane, parallel with the first frame 21, at a predetermined distance therebelow. Both ends of the second frame 24 are fastened to the side plates 22 by bolts 23. Two bushings 25 are provided in the second horizontal frame 24 at a predetermined distance apart from one another. A bolt 26 is slidably inserted into each of the bushings. The tips of the bolts threadably received within the brackets 28. Each bracket 28 is affixed to the frame 1 by a bolt 27. A coil spring 29 is disposed between a flange portion 30 of each of the bushings 25 and an edge portion of each of the brackets 28 to elastically couple the horizontal frame 24 with the frame 1 to prevent the transfer of shock to the supporting frame 20. A flange 31 is affixed to the central portion of the horizontal frame 21. The supporting frame 20 is attachable to a robot arm (not shown) by means of the flange 31.

In operation, the arm (not shown) is driven to move the supporting frame 20 to a position above the material or article to be handled. Then, the frame 20 is lowered. The adsorption pad 3 first contacts the upper surface of the material whereby an adsorption space is formed. The vacuum chamber then is connected to a vacuum sorce (not shown) by means of a valve (not shown) or the like, the pressure in the vacuum chamber 2A is reduced and the packaging film of the material is adsorbed by the sponge material 8. Thereafter, the arm (not shown) is driven to move the material adsorbed to the hand to a predetermined position. When the chamber 2A is returned to atmospheric pressure, the material is released.

Figure 3:
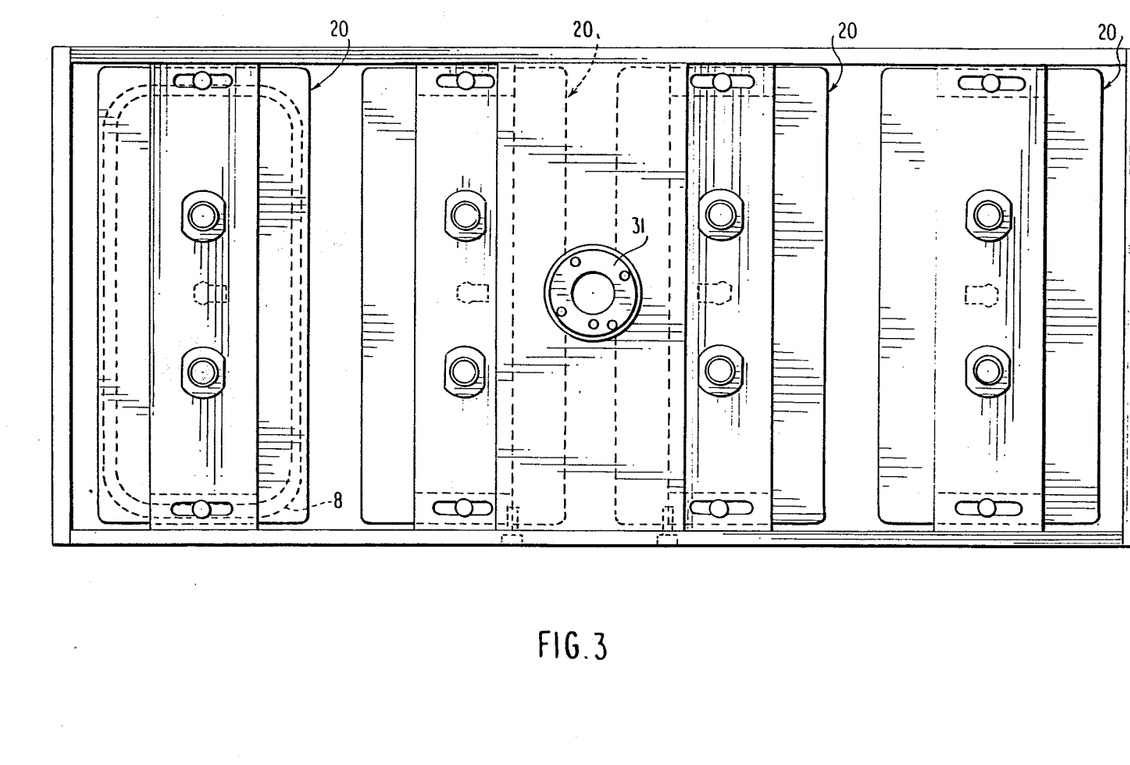
FIG. 3 is a downwardly-looking view showing another embodiment of a vacuum adsorption hand according to the present invention.

While the above-described embodiment provides a single preferred adsorption hand, a plurality of adsorption hands likewise can be provided. Such an embodiment is shown in plan view in Fig. 3. In FIG. 3, four supporting frames 20 for four frames 1 (not shown in FIG. 3) are attachable to a material handling machine (not shown) by means of a single flange 31. In the arrangement of FIG. 3 the porous plates, the sponge-like elements 8 and other elements of the hand not shown in FIG. 3 are the same as those discussed in connection with FIGS. 1 and 2.

According to the vacuum adsorption hand of the present invention since the sponge-like element 8 is attached to the outer surface of the porous plate 6, even if the materials to be handled comprise packaged articles, wrapped by a plastic film or the like, the film will not obstruct the openings 7 in the porous plate. Therefore, the area on which the adsorbing force acts is substantially equal to the area of the vacuum chamber to result in an increased adsorbing force. Thus, the adsorption hand according to the present invention can be implemented in a compact size and still provide the desired adsorbing force. Further, since the sponge-like element contacts the material, the material will not be damaged. The sponge-like element also functions as a filter to prevent obstruction of the openings of the vacuum source or the vacuum chamber.

Embodiments of a composite hand mechanism according to the present invention for use with an industrial robot will be described with reference to FIGS. 4 through 9.

Figure 4:
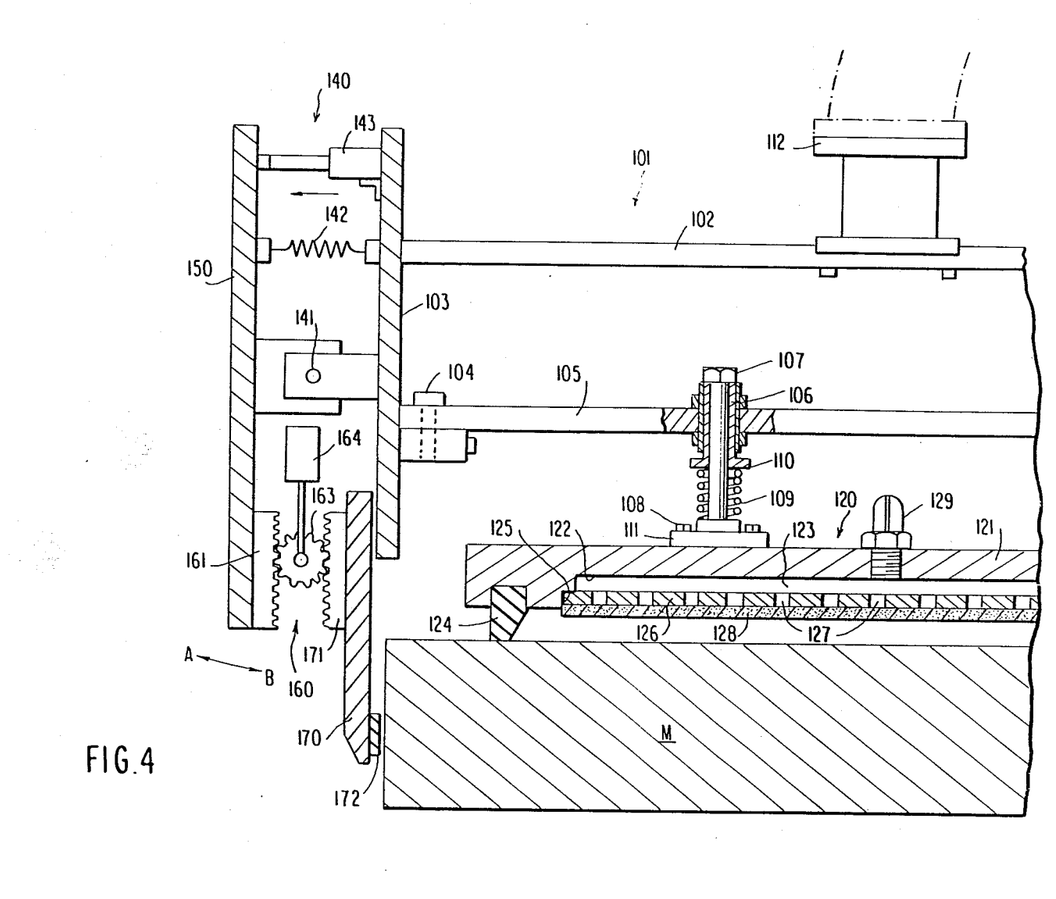
FIG. 4 is a partial, front cross-sectional view of an embodiment of a composite hand mechanism according to the present invention for use with an industrial robot.

With particular reference to FIG. 4, a preferred material-handling hand comprises a frame 101, an adsorbing mechanism 120 located at about the central portion of the frame 101, and grasping mechanisms 140 disposed on opposing sides of the adsorbing mechanism 120 (one grasping mechanism shown in FIG. 4).

The frame 101 is connectable to a material handling machine (not shown), for example, the arm of a robot. The frame 101 comprises a first horizontal frame 102 which lies in a first horizontal plane, side plates 103 supporting both sides of the horizontal frame 102, and a second horizontal frame 105 which lies in a second horizontal plane, parallel with the frame 102, at a predetermined distance therebelow. Both sides of the second horizontal frame 105 are fastened to the side plates 103 by bolts 104. Two bushings 106 are anchored in the second horizontal frame 105 at a predetermined distance from each other. A bolt 107 is slidably received within each of the bushings 106. The tip of each bolt 107 is secured to an adsorption plate 121 by the receptive portion 108 of a bracket 111. A coil spring 109 is disposed between a flange portion 110 of each of the bushings 106 and the brackets 111 to elastically couple the horizontal frame 105 and the adsorption plate 121 to prevent the transfer of shock to the frame 101. A flange 112 is affixed on the central portion of the horizontal frame 102. The frame 101 is connected to an arm (not shown) of a material handling machine (not shown) by means of the flange 112.

The adsorption plate 121 of the adsorbing mechanism 120 is generally rectangular. A concave portion 122 is formed in the lower surface of the adsorption plate 121 to face a material to be handled identified by the reference character M. The concave portion 122 provides a portion of a vacuum chamber 123. An adsorption pad 124 is attached to the peripheral portion of the concave portion 122. The inside edge of the pad 124 is tapered to provide better adsorption of the upper surface of the material and increase the pad's hermetical properties. An enlarged mouth section 125 is formed in the peripheral edge portion of the concave portion 122. A porous plate 126 is disposed in the enlarged section 125. The concave portion 122 together with the porous plate 126 complete the vacuum chamber 123 in the preferred embodiment. A plurality of openings 127 are indicated in the porous plate 126. In the embodiment of FIG. 4, the porous plate 126 likewise preferably comprises a perforated metal plate. A sponge-like element 128 having continuous air bubbles therein is attached to the outer surface of the porous plate 126 to face the material M. A connector 129 connectable to a vacuum source (not shown) is provided in the central portion of the adsorption plate 121.

Figure 5:
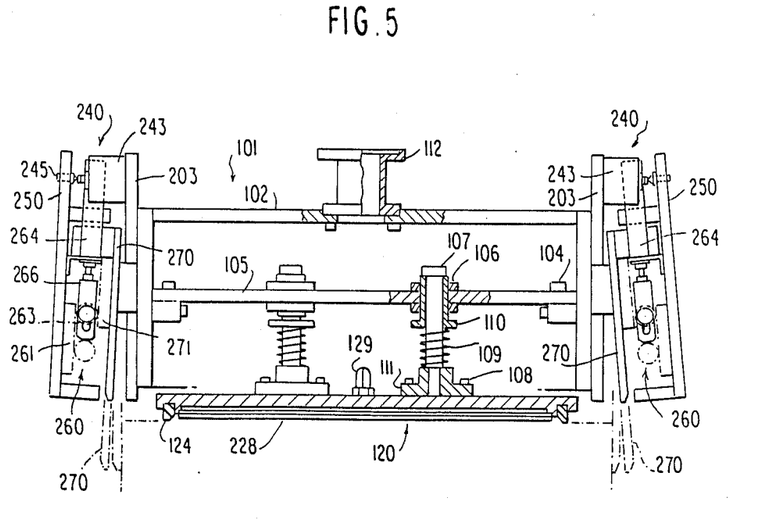
FIG. 5 is a front cross-sectional view of another embodiment of the composite hand mechanism according to the present invention.

Each grasping mechanism 140 comprises a sandwiching frame 150, a rack and pinion mechanism 160, and a sandwiching plate 170 As shown in FIG. 5, a grasping mechanism 140 is provided on at least two opposing sides of the adsorption mechanism 120. Each sandwiching frame 150 is pivotally attached to the side plate 103 by a hinge pin 141. Each rack and pinion mechanism 160 and each sandwiching plate 170 is connected to a sandwiching frame 150. When the sandwiching frame 150 swings, the rack and pinion mechanism 160 and the sandwiching plate 170 also swing so that the material M can be sandwiched between the sandwiching plates of the opposing grasping mechanisms.

A coil spring can be used to increase the sandwiching width. Also, a piston unit can be used to sandwich the material. Accordingly, in the embodiment of FIG. 4, a coil spring 142, located above the pivot point defined by hinge pin 141, biases the upper portions of the sandwiching frame 150 toward the side plate and therefore urges the lower portions of the sandwiching frame outwardly from the side plate. The piston unit 143, disposed above the spring 142, between the frame 150 and the side plate 103, forces the lower portions of the frame 150 toward the plate 103 and thus the material to be sandwiched The rack and pinion mechanism 160 comprises a first rack 161 affixed to the sandwiching frame 150, a second rack 171 similarly affixed to the sandwiching plate 170, a pinion 163 arranged to simultaneously engage the racks 161 and 171 and a piston unit 164 to drive the pinion 163. The sandwiching plate 70 is vertically movable with respect to the sandwiching frame 50. Preferably, when the pinion 163 is driven by the piston unit 164, the rack 171 and plate 170 move a vertical distance equal to twice the vertical distance moved by the piston of the piston unit 164. A pad 172 is attached to the sandwiching plate 170 for providing a soft contact with the material M.

The embodiment of FIG. 4 operates in the following manner. By moving the arm (not shown) of a robot (not shown), the adsorbing mechanism 120 is moved to a position over the material M. The sandwiching frame 150 is rotated in the direction indicated by arrowhead A by the bias of the coil spring 142 to open the sandwiching plate 170. In the case that there are insufficient gaps between the adjacent materials M, it is impossible to sandwich one of said materials M at the opposite sides thereof by means of the sandwitching plates 170. To overcome this problem, the material M is first adsorbed and lifted to a predetermined height. Thereafter, the right and left sandwiching plates 170 are moved by the rack and pinion mechanisms 160 to the position at which the material M can be grasped. After the sandwiching plates 170 are set to the proper vertical position by their respective piston units 164, the piston units 143 are activated to drive the upper portions of the frames 150 outwardly whereby the sandwiching plates 170 are rotated as indicated by arrowhead B in FIG. 4. In this manner, the material M is grasped by its sides by the right and left sandwiching plates 170. When the material M is thus grasped, the central portion of the material M is generally centered with the hand. After the material is so adsorbed and grasped, the material-handling arm (not shown) is driven to perform desired material handling tasks. To release the material M, air is introduced into the vacuum chamber to extinguish the adsorbing force. Thereafter, the pistons of the piston units 143 are contracted to permit the sandwiching plates 170 to be rotated in the direction of the arrowhead A by the bias of the coil springs 142 to separate the plates 170 from the material.

FIGS. 5-8 show an alternative embodiment of a composite mechanism hand according to the present invention. In FIGS. 5-8, the same reference characters are assigned to corresponding elements in FIG. 4.

In FIGS. 5-8, the grasping mechanisms 240 provided on both sides of the adsorbing mechanism 228, are identical and therefore only one of them will be described. As particularly shown in FIGS. 7 and 8, an L-shaped bracket 251 is mounted to each side plate 203 by bolts 252. The sandwiching frame 250 is pivotally mounted to the brackets 251 by the hinge pin 241.

The piston unit 264 is attached to the sandwiching frame 250 by an L-shaped bracket 253. As clearly seen in FIG. 7, two longitudinally-extending shafts 255 are attached by L-shaped metal fittings 254. The sandwiching plate 270 is vertically guided by the shafts 255.

Figure 6:
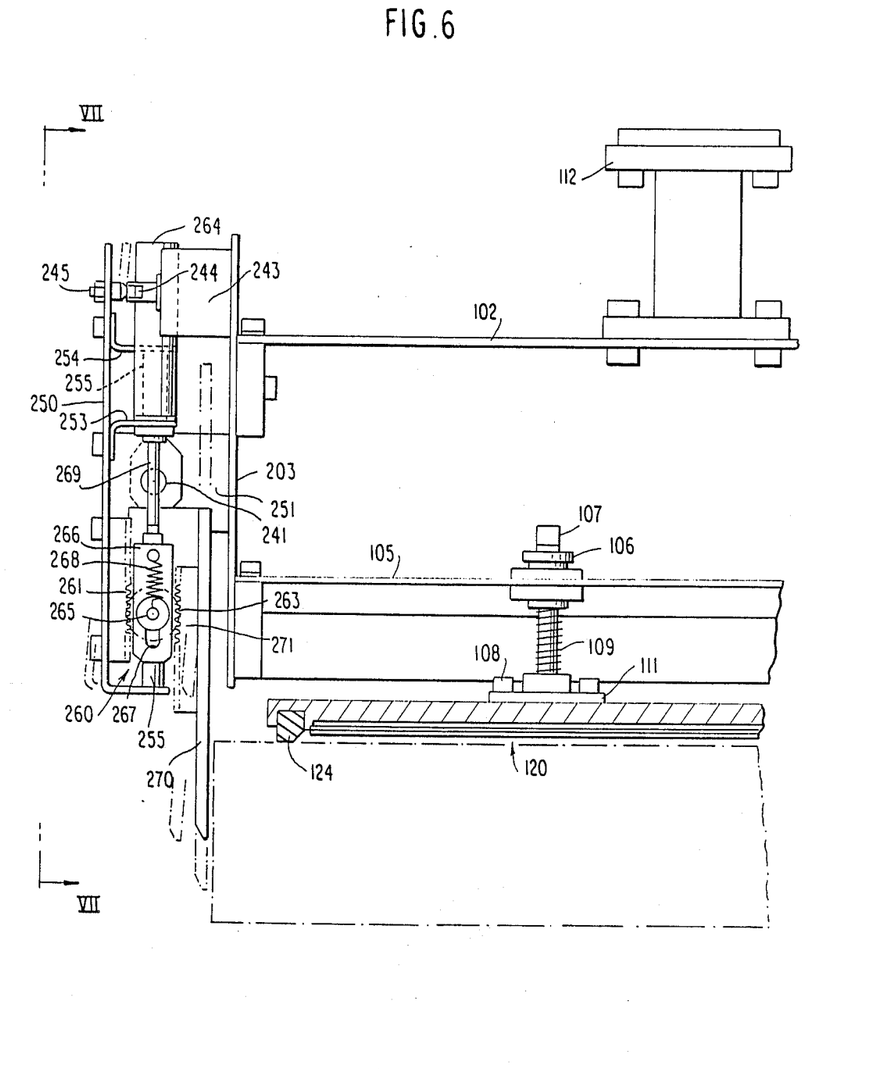
FIG. 6 is an enlarged, partial, front cross-sectional view of the mechanism of FIG. 5.
Figure 7:
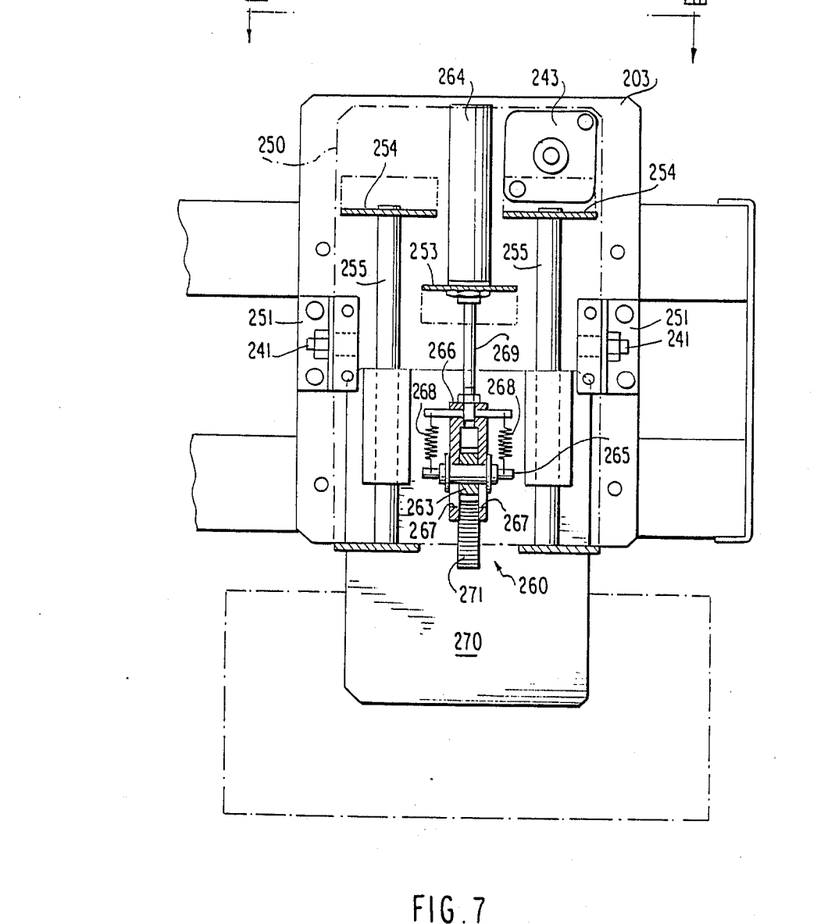
FIG. 7 is a side elevational view taken along the line VII—VII in FIG. 6.
Figure 8:
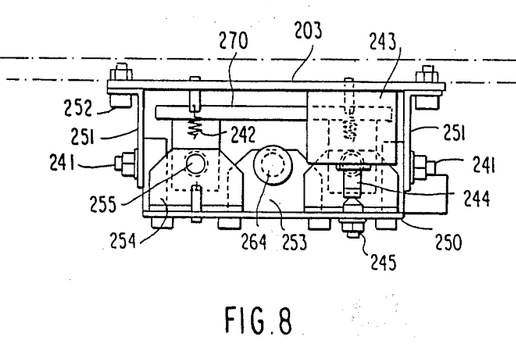
FIG. 8 is a partial, downwardly-looking view taken along the line VIII—VIII in FIG. 7.

With further reference to FIG. 7, the rack and pinion mechanism 260 is located in the central portion of the sandwiching frame 250. As shown in FIG. 6, a rack 261 is affixed to the inside of the frame 250 and another rack 271 is disposed in opposition to the rack 261 on the inside of the plate 270. The pinion 263 is disposed between the racks 261 and 271. A rotatable rack pin 265 axially supports the pinion 263. The rack pin 265 slides in an elongate slot 267 in the driving apparatus 266. The rack pin 265 is urged upwardly by a spring 268. If a sudden load is applied to the sandwiching plate 270, the rack pin 265 moves in the slot 267 to prevent damaging of the plate 270. The driving apparatus 266 is coupled with a piston rod 269 of the piston unit 264.

Two piston units 243 are mounted to the upper portion of the side plate 203. A head pin 244 is attached to the tip of each piston rod. Head receiving members 245 are threadably attached to the sandwiching frame 250 in opposition to the head pins 244. By adjusting the position of the head receiving members 245, the stroke of the pistons of the units 243, and thus the sandwching width of the plates 270, can be adjusted. Below the piston cylinder units 243, two coil springs 242 are attached between the side plate 203 and the frame 250.

The embodiment of FIGS. 5-8 operates similar to that of the embodiment of FIG. 4.

Figure 9:
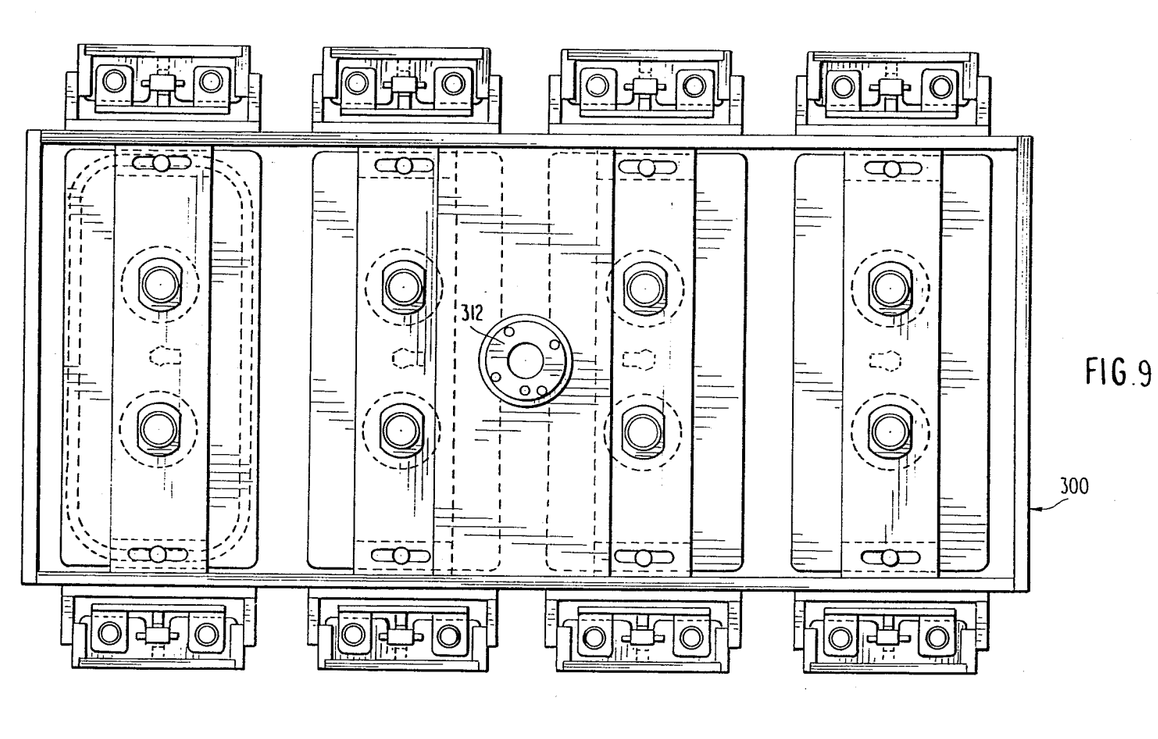
FIG. 9 is a downwardly-looking view of another embodiment of a composite hand mechanism according to the present invention.

In the embodiments of FIGS. 4-8, single composite hand mechanisms according to the present invention were described. However, a plurality of mechanisms according to either of the latter embodiments can be provided in parallel. In the embodiment of FIG. 9, four frames with four adsorbing mechanisms, and eight grasping mechanisms according to the present invention are shown as adapted for attachment by a common frame assembly 300 and a flange 312. Two grasping mechanisms are provided for each of the frames. Therefore, four articles can be handled simultaneously. On the other hand, for palletizing, the respective positions of the articles can be changed to arrange the articles as desired.

As described in detail above, according to the composite hand mechanism of the invention for use with an industrial robot, the grasping mechanisms to grasp a piece of material are disposed on at least two sides of an adsorbing mechanism capable of adsorbing the upper surface of the material. Therefore, a deficiency of adsorbing mechanisms is solved. Even if a force in the lateral direction acts on the material held, the material will not be released from the adsorbing mechanism. Further, since the sandwiching plates of the grasping mechanisms are driven by rack and pinion mechanisms, the distance the pinion is actually driven is relatively short whereby the entire hand mechanism can be implemented in a compact size. Further, since the sandwiching plates are vertically movable, the plates can be moved upwardly to permit the performance of material handling solely by the adsorbing mechanism.

The present invention is not limited to the foregoing embodiments but many modifications and variations are possible within the spirit and scope of the present invention as set forth in the claims.

What is claimed is:

1. A composite hand mechanism for use with a material handling apparatus having an arm with a wrist portion, said mechanism comprising:

a frame;

means for connecting said frame to the wrist portion;

adsorbing means on a central portion of said frame for adsorbing a surface of an article to be handled by vacuum force; and a plurality of grasping means arranged on said frame adjacent sides of said adsorbing means for grasping side surfaces of the article therebetween, each of said grasping means including a first member, hinge pin means for pivotably connecting said first member to said frame, means for pivotably moving said first member with respect to said frame with adjustable force;

a second member adapted to grasp the side surfaces of the article, actuating means for causing vertical movement of said second member and having a driven means and a driving means for driving said driven means, and rack and pinion means disposed between said members for translating motion of said driven means to said second member, said rack and pinion means moving said second member twice a distance said driving means drives said driven member.

* * * * *